3,119,883
DEHYDROGENATION OF ETHANE

Harris Eudell Kluksdahl, Wilmington, Del., assignor to E. I. du Pont de Nemours and Company, Wilmington, Del., a corporation of Delaware
No Drawing. Filed Aug. 8, 1960, Ser. No. 47,898
4 Claims. (Cl. 260—683.3)

The present invention relates to the catalytic dehydrogenation of hydrocarbons, and, more particularly, to the dehydrogenation of ethane to ethlylene using novel catalysts.

The art of dehydrogenating organic compounds is old and well-established. However, heretofore the art has failed to provide a continuous process for the dehydrogenation of ethane to ethylene which is competitive with other methods of producing ethylene. Thus, prior art catalysts suitable for the catalytic dehydrogenation of ethane to ethylene were found to have one or more of the following deficiencies. Many of the known dehydrogenation catalysts become fouled with carbon deposits and inactive when used in the dehydrogenation of ethane to ethylene. The commercial use of such catalysts would require frequent and sometimes difficult and expensive regeneration. Many of the catalysts described, furthermore, result in either low conversions to dehydrogenation products or in low yields of ethylene, or are deficient in both respects. It is particularly desirable to keep the formation of hydrogenation and carbon monoxide down to a low level, since such products are not readily recovered from the product stream.

It is, therefore, the principal object of the present invention to provide an economic process for the catalytic dehydrogenation of ethane to ethylene using a novel dehydrogenation catalyst. Other objects will become apparent hereinafter.

In accordance with the present invention, it was discovered that the dehydrogenation of ethane to ethylene can be greatly improved by the use of a catalyst comprising zinc oxide containing from 1 to 10 mol percent of an oxide of a metal selected from the class consisting of iron, tin, bismuth and lead, and, preferably, also containing a trace, less than 1%, of an alkali metal. The combination of zinc oxide with lead oxide is by far the preferred catalyst composition in that it results in the highest yields and conversions to ethylene when employed in the catalytic dehydrogenation of the present invention.

The dehydrogenation of ethane in accordance with the present invention is carried out by passing a mixture of ethane and molecular oxygen through a bed of the catalyst at elevated temperatures, and thereafter condensing the reaction product and separating out the desired ethylene, such recovery being in accordance with known techniques. The concentration of the oxygen, in general, should be less than 30 volume percent of the reagent mixture fed to the dehydrogenation zone. At higher concentrations of oxygen, violent explosions result. The oxygen concentration may, of course, be substantially decreased from the upper limit, although at the lower concentration, i.e., below 10%, the conversion of ethane to ethylene is substantially reduced.

The external reactor temperature is preferably maintained between 400 and 700° C. The dehydrogenation reaction is exothermic so that the catalyst itself is at a higher temperature. The occurrence of catalytic dehydrogenation is characterized by the formation of a glowing zone in the catalyst bed which itself has a temperature of about 900° C. It is believed that the actual catalytic dehydrogenation occurs in this glowing zone. At bed temperatures of 500 to 600° C., this glowing zone moves through the catalyst bed at a rapid rate. Once the glowing zone has moved through the entire catalyst bed, the catalyst can be reused by raising the external temperature. At externally applied temperatures of greater than 550° C., the glowing zone does not move through the catalyst bed, or moves at an extremely slow rate so that the dehydrogenation can be carried out continuously for long periods of time. Although a bed temperature of 400° C. is, in general, necessary to initiate the catalysis and to form the glowing zone, once the glowing zone has been formed, the externally applied heat can be turned off and catalysis will continue for short periods of time, although thereafter the catalyst is inactive unless heated to temperatures above 550° C. At catalyst bed temperatures above 1000° C., the catalyst becomes rapidly coated with carbon deposits. The formation of carbon deposits should be prevented since such carbon deposits lead to the extinction of the glowing zone and the catalytic activity of the dehydrogenation catalyst employed in the present invention. It is, in general, preferred to preheat the feed streams prior to contact with the dehydrogenation zone.

The contact time of the ethane/oxygen mixture with the dehydrogenation catalyst is not critical, but is preferably maintained at less than 2 seconds in the glow zone. Inert gaseous diluents, such as nitrogen or steam, may be employed if it is desired to decrease the contact time of the reaction mixture with the catalyst. The dehydrogenation can be carried out at sub-atmospheric, atmospheric and super-atmospheric pressure. As is apparent from the foregoing description, the dehydrogenation of the present invention can be carried out on a continuous scale. Various methods of contacting the catalyst with the ethane/oxygen mixture will be apparent to those skilled in the art. In one specific embodiment, the reaction mixture is contacted with a fixed bed of the catalyst. If it becomes necessary to regenerate the catalyst, such can be readily accomplished by heating the catalyst to temperatures of 700 to 1000° C. while passing a stream of oxygen through the bed. Instead of pure molecular oxygen, mixtures of oxygen with inert diluents, such as air, may be employed in the process of the present invention.

The catalysts are preferably prepared by dissolving a soluble zinc salt and a soluble salt of the metal of the secondary metal oxide in an aqueous medium, and thereafter precipitating the dissolved salts as oxides by addition of an alkali metal hydroxide. Stoichiometric quantities of the alkali metal hydroxide are sufficient for the precipitation. The precipitate is washed with water several times and dried. The resulting product may be used in bulk form or pelletized for easier use in the catalyst bed. The resulting concentration of the alkali metal in the precipitate is sufficient to achieve the contributing effect of the alkali metal in the catalyst of the present invention. In another method, the catalyst may be formed by mixing oxides of zinc and the secondary metal and thereafter treating such mixtures with an aqueous solution of an alkali metal salt. Increase in the alkali metal concentration to above 1% results in higher carbon deposits, and, thus, concentrations above 1% of the alkali metal should be avoided. As indicated above, the preferred secondary metal oxide is lead oxide. The concentration of the secondary metal oxide is from 1 to 10 mol percent, and, preferably, is around 5 mol percent of the entire catalyst composition. Of the alkali metal hydroxides, sodium hydroxide is preferred in causing the precipitation of the metal oxides. Calcination of the precipitated metal oxide either in air, nitrogen or a vacuum, does not significantly improve the catalytic activity of the dehydrogenation catalyst.

The present invention is further illustrated by the following examples.

EXAMPLES I TO VIII

Oxygen and ethane were fed into a reactor comprising an 18″ "Vycor" glass tube having an O.D. of 25 mm. The first 5″ of the reactor served as the preheater. The preheater was maintained at a temperature of 400° C. by means of an electric furnace surrounding the "Vycor" tube. The remaining 13″ section of the "Vycor" tube served as the reactor and was filled with the catalyst indicated in the table. The temperature of the catalyst bed was measured by a thermocouple placed in the center of the bed. The catalyst bed was heated externally by an electric furnace maintained at a temperature of 500° C. The effluent from the reactor was passed through a water-cooled condenser and then analyzed by gas chromatography. The catalysts employed in the various examples listed in the table were prepared by using, in general, the nitrate of the metals, in the ratios indicated in the table, dissolving the salts in water, and thereafter precipitating the mixed metal oxides by addition of an alkali metal hydroxide. The resulting products were then washed twice with water and dried and used in bulk form. The table below shows the catalyst compositions employed, the feed rates of ethane and oxygen, the reactor temperature, the contact time, the composition of the exit gases, the conversion of the feed stream to products, the conversion of the feed stream to ethylene and the yield of ethylene.

The foregoing examples are intended to be illustrative only and not in any way to limit the process of the present invention. It will be apparent that various modifications can be employed with the novel dehydrogenation catalysts of the present invention. The separation of the reaction products obtained by the dehydrogenation, in accordance with the present invention, can be carried out by various techniques, such as distillation, etc. A particularly useful method for the separation of the olefin from the reaction product comprises the absorption of the ethylene by a silver fluoroborate solution, such as described in U.S. Patent No. 2,913,505, issued on November 17, 1959, to Van Raay et al. Since the process of the present invention gives rise to only small amounts of $H_2$, $O_2$ and CO, which adversely affect the separation of ethylene from hydrocarbon mixtures containing such using silver fluoborate, the combination of the process of the present invention with the silver fluoroborate separation provides an outstanding process for the preparation of ethylene.

I claim:
1. Process for the dehydrogenation of ethane to ethylene which comprises passing a mixture of ethane and oxygen, wherein the oxygen content is from 10 to 30 volume percent, over a zinc oxide catalyst at dehydrogenation temperatures, said catalyst consisting essentially of zinc oxide and from 1 to 10 mol percent, based on the total composition, of a metal oxide wherein the metal is from the class consisting of lead, tin, bismuth and iron, and up to 1 wt. percent, based on the total composition, of an alkali metal.

2. Process for the dehydrogenation of ethane to ethylene which comprises passing a mixture of ethane and oxygen, wherein the oxygen content is from 20 to 30 volume percent, over a catalyst at a temperature of 400° to 1000° C., said catalyst consisting essentially of zinc oxide, 1 to 10 mol percent, based on the total composition, of a metal oxide, wherein the metal is from the class consisting of lead, tin, bismuth, and iron and up to 1 wt. percent, based on the total composition, of an alkali metal.

3. The process as set forth in claim 2 wherein the secondary metal oxide is lead oxide.

4. The process as set forth in claim 3 wherein the alkali metal is sodium.

*Table*

| Example | Catalyst composition in mol percent | Feed in l./min. | | Reactor temp., °C. | Contact Time/sec. | Exit composition in l./min. | | | | | | | Conversion to product in percent | Conversion to $C_2H_4$ in percent | Yield of $C_2H_4$ in percent |
|---|---|---|---|---|---|---|---|---|---|---|---|---|---|---|---|
| | | $C_2H_6$ | $O_2$ | | | $H_2$ | $O_2$ | CO | $CH_4$ | $C_2H_6$ | $CO_2$ | $C_2H_4$ | | | |
| I | 95% ZnO + 5% PbO + Na trace (~0.2 wt. percent). | 1.55 | 0.6 | 770 | 2 | trace | trace | 0 | 0.108 | 1.00 | 0.244 | 0.470 | 35.5 | 30.3 | 85.5 |
| II | 95% ZnO + 5% PbO + Na trace (~0.2 wt. percent). | 1.57 | 0.595 | 620 | 2 | 0 | 0.017 | 0 | 0.048 | 1.025 | 0.226 | 0.478 | 34.4 | 30.4 | 88.5 |
| III | 95% ZnO + 5% PbO + Li trace (~0.1 wt. percent). | 1.54 | 0.639 | 850 | 2 | 0.107 | 0.024 | 0.032 | 0.118 | 0.778 | 0.209 | 0.562 | 48.8 | 36.5 | 74.9 |
| IV | 97.5% ZnO + 2.5% $Fe_2O_3$ + Na trace (~0.2 wt. percent). | 1.50 | 0.642 | 600 | 2 | 0.099 | ~0 | 0 | 0.070 | 1.036 | 0.280 | 0.396 | 30.7 | 26.4 | 86.1 |
| V | 95% ZnO + 5% SnO + Na trace (~0.2 wt. percent). | 1.51 | 0.723 | 720 | 0.3 | 0.274 | 0.041 | 0.063 | 0.106 | 0.798 | 0.245 | 0.527 | 47.0 | 34.9 | 74.3 |
| VI | 97.5% ZnO + 2.5% $Bi_2O_3$ + Na trace (~0.2 wt. percent). | 1.517 | 0.671 | 650 | 0.3 | 0.038 | 0.374 | 0 | 0.051 | 1.178 | 0.118 | 0.2 | 21.8 | 13.3 | 61.0 |
| VII | 95% ZnO + 5% PbO + Na trace (~0.2 wt. percent). | 1.55 | 0.60 | 700 | 2 | trace | trace | 0 | 0.095 | 0.99 | 0.23 | 0.482 | 36.1 | 31.1 | 86.2 |
| VIII | 95% ZnO + 5% PbO | 1.53 | 0.637 | 720 | 2.7 | 0 | 0.328 | 0 | 0.036 | 1.292 | 0.16 | 0.112 | 11.8 | 7.7 | 65.0 |

References Cited in the file of this patent

UNITED STATES PATENTS

| | | |
|---|---|---|
| 1,776,771 | Boomer | Sept. 30, 1930 |
| 2,143,014 | Klein | Jan. 10, 1939 |
| 2,161,991 | Baehr | June 13, 1939 |
| 2,398,612 | Bergsteinsson et al. | Apr. 16, 1946 |
| 2,418,888 | Kearby | Apr. 15, 1947 |
| 2,436,970 | Mistretta | Mar. 2, 1948 |
| 2,529,293 | Hall | Nov. 7, 1950 |
| 2,541,680 | Vesterdal | Feb. 13, 1951 |
| 2,548,486 | Lynch | Apr. 10, 1951 |
| 2,794,053 | Altrevter et al. | May 28, 1957 |
| 2,820,072 | Wood et al. | Jan. 14, 1958 |
| 2,848,521 | Polk | Aug. 19, 1958 |
| 2,945,900 | Alexander et al. | July 19, 1960 |